(12) United States Patent
Copeland et al.

(10) Patent No.: US 7,263,934 B2
(45) Date of Patent: Sep. 4, 2007

(54) METHODS FOR GENERATING ENERGY USING AGRICULTURAL BIOFUEL

(75) Inventors: Brian Copeland, Pheonix, AZ (US); Gregory Scott Coil, Hartland, MN (US); Robert A Latta, Jr., Edina, MN (US); Thomas Anthony Lenaghan, Nevada, IA (US)

(73) Assignees: Harris Contracting Company, St. Paul, MN (US); Alliant Energy Corporate Services, Inc., Cedar Rapids, IA (US); VCN Roll, Inc., Norcross, GA (US)

( * ) Notice: Subject to any disclaimer, the term of this patent is extended or adjusted under 35 U.S.C. 154(b) by 505 days.

(21) Appl. No.: 10/373,668

(22) Filed: Feb. 24, 2003

(65) Prior Publication Data

US 2005/0274308 A1 Dec. 15, 2005

(51) Int. Cl.
*F23G 7/04* (2006.01)

(52) U.S. Cl. .................. 110/346; 110/348; 110/245

(58) Field of Classification Search ............. 110/224, 110/243, 244, 245, 348, 346
See application file for complete search history.

(56) References Cited

U.S. PATENT DOCUMENTS

| | | | | |
|---|---|---|---|---|
| 3,309,262 | A | 3/1967 | Copeland et al. | 162/30 |
| 3,462,246 | A | 8/1969 | Copeland | 23/284 |
| 3,653,843 | A | 4/1972 | Seelander | 23/284 |
| 3,674,630 | A | 7/1972 | Copeland | 162/30 |
| 3,736,908 | A * | 6/1973 | Ehrlich et al. | 122/4 D |
| 4,111,158 | A * | 9/1978 | Reh et al. | 122/4 D |
| 4,548,138 | A * | 10/1985 | Korenberg | 110/245 |
| 4,793,981 | A * | 12/1988 | Doyle et al. | 423/239.1 |
| 4,848,249 | A | 7/1989 | LePori et al. | 112/234 |
| 5,176,513 | A * | 1/1993 | Zinn et al. | 432/58 |
| 5,664,942 | A | 9/1997 | Bayer | 431/7 |
| 5,752,451 | A * | 5/1998 | Schaker et al. | 110/165 R |
| 5,832,713 | A | 11/1998 | Maese et al. | 60/39.02 |
| 5,975,439 | A | 11/1999 | Chieffalo et al. | 241/17 |
| 6,042,369 | A | 3/2000 | Bergman et al. | 432/15 |
| 6,190,429 | B1 | 2/2001 | Fujimura et al. | 48/197 R |
| 6,298,651 | B1 | 10/2001 | Iijima | 60/39.02 |
| 6,328,234 | B1 | 12/2001 | Saucier et al. | 241/1 |
| 6,355,456 | B1 | 3/2002 | Hallberg et al. | 435/161 |
| 2002/0007772 | A1 | 1/2002 | Janssen et al. | 110/345 |
| 2002/0020112 | A1 | 2/2002 | Stivers | 48/198.2 |
| 2003/0019736 | A1* | 1/2003 | Garman | 203/23 |
| 2004/0040910 | A1* | 3/2004 | Steimel et al. | 210/700 |

* cited by examiner

*Primary Examiner*—Kenneth Rinehart
(74) *Attorney, Agent, or Firm*—Schwegman, Lundberg, Woessner & Kluth P.A.

(57) ABSTRACT

A process comprising, providing an agricultural biofuel to a fluidized bed reactor and combusting the agricultural biofuel to produce heat and/or steam is disclosed. In one embodiment, the agricultural biofuel is selected from the group consisting of agricultural crops, crop residues, grain processing facility waste, value-added agricultural facility byproducts, livestock production facility waste, livestock processing facility waste and food processing facility waste. In one embodiment, the heat and/or steam is used to generate electricity. In other embodiments, the heat and/or steam is used to power the grain processing facility, livestock production facility, livestock processing facility or food processing facility. In another embodiment, one or more environmental controls are used. In a particular embodiment, ethanol byproducts are used as the agricultural biofuel.

9 Claims, 2 Drawing Sheets

METHODS FOR GENERATING ENERGY USING AGRICULTURAL BIOFUEL

FIELD

This invention relates to a fluidized bed system, and, in particular, this invention relates to a fluidized bed agricultural biofuel energy generating system.

BACKGROUND

Production waste streams are quickly becoming a significant liability due to increasingly stringent environmental standards requiring proper disposal. As disposal costs continue to increase, options for disposing of production waste continue to decline.

In some industries, such waste streams have commercial value and can be sold at a profit. However, due to dramatic domestic growth in many industries, such as value-added agricultural industries, the value of such byproducts continues to decrease. One example of a value-added agricultural industry experiencing dramatic growth is ethanol production from corn. As a result, the ethanol byproduct known as "distiller's dry grain with solubles" (DDGS) is expected to lose value in the near future due to market oversupply.

Thus, what is needed is a safe and profitable means for handling production waste streams that meet stringent new environmental regulations.

SUMMARY

A process comprising, providing an agricultural biofuel to a fluidized bed reactor and combusting the agricultural biofuel to produce heat is disclosed. In one embodiment, the heat is converted to steam. In one embodiment, the agricultural biofuel is selected from a group consisting of agricultural crops, crop residues, grain processing facility waste, value-added agricultural facility byproducts, livestock production facility waste, livestock processing facility waste and food processing facility waste. In one embodiment, the heat and/or steam is used to generate electricity. In other embodiments, the heat and/or steam is used to power the grain processing facility, livestock production facility, value-added agricultural facility (e.g., ethanol facility), livestock processing facility or food processing facility. In one embodiment, the agricultural biofuel is a high moisture agricultural biofuel. In another embodiment, one or more environmental controls are used to control emissions.

In one embodiment, a process for producing steam comprising providing an agricultural biofuel, such as ethanol byproducts, to a fluidized bed reactor and combusting the agricultural biofuel to produce steam is provided. In one embodiment, the steam is used to generate electricity.

In one embodiment, a process comprising, in a fluidized bed reactor converting an ethanol byproduct to heat with a combustion process is provided. In one embodiment, the heat is converted to steam in a waste heat boiler. In another embodiment, the steam is used to generate electricity.

In one embodiment, a process for producing steam comprising, in a fluidized bed reactor, converting an ethanol byproduct to steam with a combustion process is provided. In one embodiment the ethanol byproduct is grain stillage syrup containing about 20 to 40% solids. In a particular embodiment, the grain stillage syrup is a corn-based syrup. In another embodiment the ethanol byproduct further includes distiller's wet grain (DWG). In another embodiment, a portion of the DWG is dried to produce distiller's dry grain (DDG) and dryer vapors. In this embodiment, the dryer vapors are input into the fluidized bed reactor such that the fluidized bed reactor itself becomes an environmental control to destroy volatile organic compounds (VOCs) from the dryer vapors.

In yet another embodiment a process comprising providing grain stillage syrup to a fluidized bed reactor to produce combustion gases; cooling the combustion gases in a boiler to produce steam and cooled combustion gases; cleaning the cooled combustion gases of particulate to produce ash and cleaned cooled combustion gases; and discharging the cleaned cooled combustion gases to the atmosphere is provided.

The energy generating system described herein provides an economical and environmentally-friendly means of handling agricultural byproducts, while producing a renewable energy source at the same time. This renewable energy source can be used as a process load. In one embodiment, energy is generated in quantities sufficient to meet the steam load of a processing plant after start-up, without the need for any added auxiliary fuel. The energy produced can additionally or alternately be commercially sold and/or used to generate electricity. Alternatively, some or all of the agricultural byproducts, such as DWG, can be sold, thus providing operational flexibility.

The system described herein not only provides a profitable means to dispose of production waste streams that meet the newer and more stringent environmental regulations, the resulting commodity, i.e., energy, can be used as an alternative power source to help reduce dependence on fossil fuels. Reducing dependence on fossil fuels, particularly on foreign oil supplies, is of particular importance in the present turbulent political and economic climate. Additionally, with energy demands expected to increase significantly in the future, use of renewable energy sources will become increasingly important.

DETAILED DESCRIPTION

Figure 1:
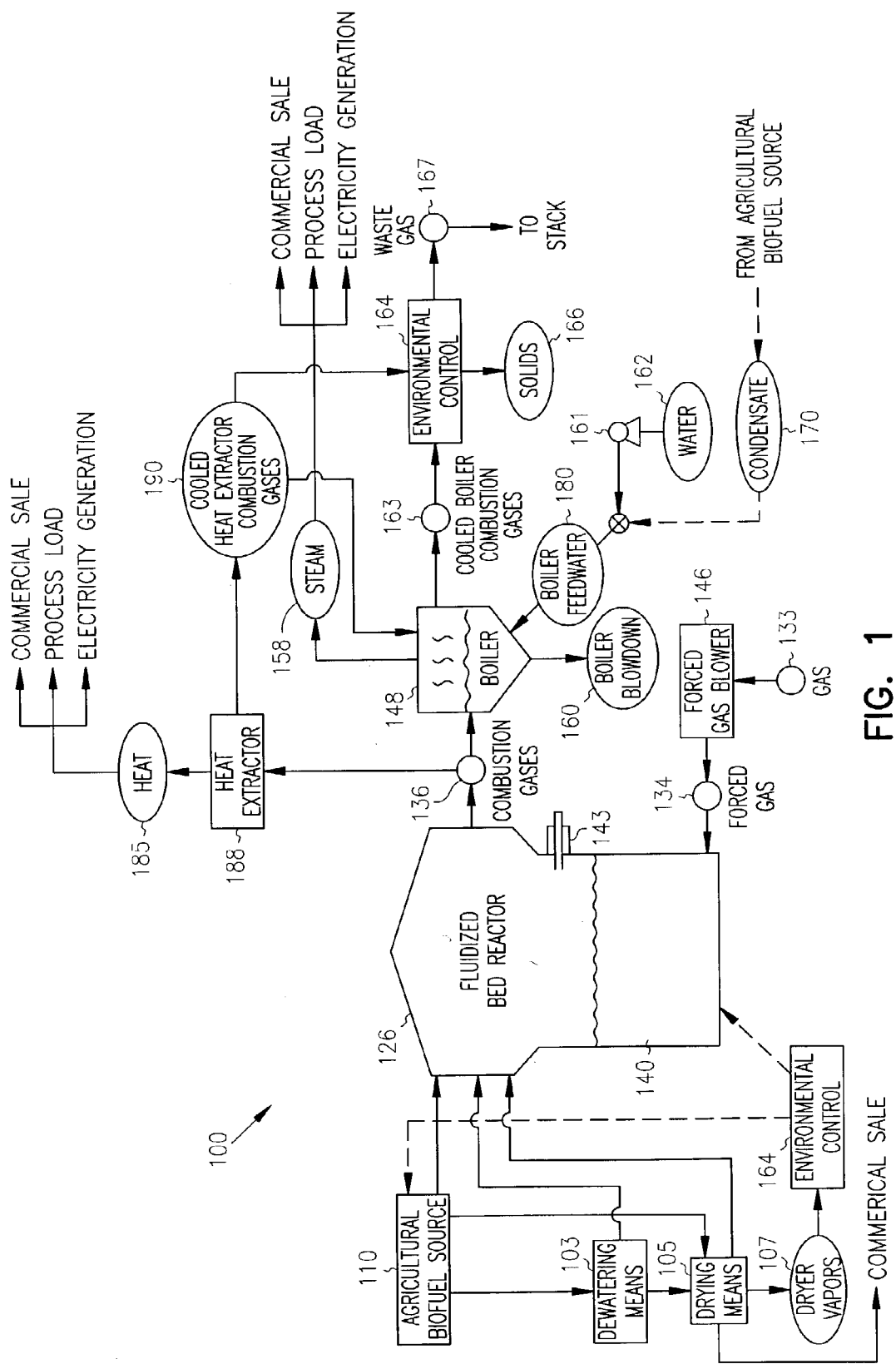
FIG. 1 is a simplified schematic drawing of a process for generating energy with a fluidized bed reactor using agricultural biofuels in one embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents.

A system in which high moisture agricultural biofuels, e.g., grain stillage syrup or grain stillage syrup and DWG, are used as feed to a fluidized bed reactor, is disclosed. The fluidized bed reactor is initially powered by a burner, which itself is powered by auxiliary fuel and used to initially heat a fluidizing media within the fluidized bed reactor. In some embodiments, the fluidized bed reactor is also used as an environmental control. For example, dryer vapors can be added to the fluidized bed reactor in order to destroy VOCs. After stabilization, the process is typically self-sustaining without the need for any auxiliary fuel. The combustion gases leave the fluidized bed reactor and can enter a heat extractor where heat is extracted (and utilized elsewhere) and/or can be transferred to a waste heat boiler to produce steam, which is also useful for a variety of applications. Cooled heat extractor combustion gases from the heat extractor can enter a suitable environmental control or be diverted to the waste heat boiler for use in producing steam. Cooled boiler combustion gases leaving the waste heat boiler can also enter a suitable environmental control, such as a baghouse filter (hereinafter "baghouse"), where the gases are cleaned of particulates before being discharged to the atmosphere via a freestanding stack.

Various terms used throughout the description are defined first, followed by an overview of an agricultural biofuel energy generating system. A detailed description of an energy generating system using ethanol byproducts as the agricultural biofuel is discussed next, followed by a brief conclusion.

Introductory Definitions

As used herein, the term "biofuel" or "biomass" refers to organic matter harvested or collected as a source of energy. Specifically, "biofuel" refers to a source material that is derived from non-fossilized organic matter and available on a renewable or recurring basis, as compared with a fossil fuel, which is derived from fossilized organic matter and is not considered to be "renewable." Biofuels are typically obtained from production waste streams, i.e., production byproducts, although they can also be obtained from sources specifically designed to produce biofuels. (Note that although a "production waste stream" and a "production byproduct" technically refer to different types of materials, these terms are used interchangeably herein). There are generally considered to be three types of biofuels, namely, agricultural biofuels (defined below), municipal waste biofuels (residential and light commercial garbage or refuse, with most of the recyclable materials such as glass and metal removed) and forestry biofuels (e.g., trees, waste or byproduct streams from wood products, wood fiber, pulp and paper industries).

As used herein, the term "agricultural biofuel" refers to a biofuel derived from agricultural crops, crop residues, grain processing facility wastes (e.g., wheat/oat hulls, corn fines, bean fines, out-of-specification materials, etc.), livestock production facility waste (e.g., manure, carcasses, etc.), livestock processing facility waste (e.g., undesirable parts, cleansing streams, contaminated materials, etc.), food processing facility waste (e.g., separated waste streams such as grease, fat, stems, shells, intermediate process residue, rinse/cleansing streams, etc.), value-added agricultural facility byproducts (e.g., distiller's wet grain (DWG) and syrup from ethanol production facilities, etc.), and the like. Examples of livestock industries include, but are not limited to, beef, pork, turkey, chicken, egg and dairy facilities. Examples of agricultural crops include, but are not limited to, any type of non-woody plant (e.g., cotton), grains such as corn, wheat, soybeans, sorghum, barley, oats, rye, and the like, herbs (e.g., peanuts), short rotation herbaceous crops such as switch grass, alfalfa, and so forth.

As used herein, the term "dispatchable power source" refers to a renewable power source available under all normal environmental conditions. An agricultural biofuel is a dispatchable power source.

As used herein, the term "non-dispatchable power source" refers to a renewable power source that varies depending upon environmental conditions. Examples include solar and wind power sources.

The term "syrup" refers to "grain stillage solubles," which is a byproduct of a value-added agricultural industry, such as ethanol production. Such syrup typically contains about 20 to 40% solids.

As used herein, the term "distiller's wet grain" (DWG) refers to a byproduct of ethanol production that contains residual grain and at least about 65% moisture. DWG is sometimes referred to as a "wet cake."

As used herein, the term "distiller's dry grain" (DDG) refers to dried DWG that contains less than 50% moisture down to about 10%. DDG has commercial value and can be sold for use as animal feed.

As used herein, the term "distiller's dry grain with solubles" (DDGS) refers to DDG and syrup combined.

As used herein, the term "volatile organic compounds" (VOCs) refers to carbon containing compounds that readily produce vapors at room temperature and normal atmospheric pressure. Volatile organic compounds include aldehydes, alcohol, gasoline, industrial chemicals such as benzene, solvents such as toluene and xylene, as well as tetrachloroethylene, perchlorethylene (dry cleaning solvent), and the like. Some volatile organic chemicals are also hazardous air pollutants.

As used herein, the term "environmental control" refers to a process step, an added component or even a piece of equipment used to control emissions. The added components can be used an aid in reducing emissions or toxic components requiring treatment by the system. One example of an added component that serves as an environmental control is the use of limestone in one embodiment. Specifically, when burned together with ethanol byproducts in a fluidized bed reactor, limestone aids in reducing the amount of sulfur dioxide emitted. In one embodiment sulfur dioxide emissions are reduced by at least 80%, by weight. One example of an added component that requires treatment is VOC-containing dryer vapors, which can be added to the fluidized bed reactor in one embodiment. Such dryer vapors include those VOCs produced when DWG and/or syrup is input into a dryer to produce DDG to be sold commercially. By processing the dryer vapors in the fluidized bed reactor, the VOCs are destroyed or substantially reduced in quantity. Other environmental controls include conventional equipment such as baghouses, scrubbers, wet or dry electrostatic precipitators, carbon filters, and the like. The specific environmental control required depends in large part on the feedstock, as is known in the art.

As used herein, the term "high moisture" refers to a moisture content of at least 20%.

Description of the Embodiments

Overview of Energy Generation from Agricultural Biofuels

As noted above and shown in FIG. 1, the system described herein provides a process 100 for generating energy from an agricultural biofuel source 110 using a fluidized bed reactor (hereinafter "reactor") 126. The energy generated can be heat and/or, with additional processing, steam. Although the agricultural biofuel source 110 can, in most instances, be used "as is," in some instances it may be desirable to dewater the agricultural biofuel source 110 with a dewatering means 103 prior to it being used in the reactor 126. The dewatering means 103 can comprise one or more centrifuges and/or evaporators as is known in the art. It is possible to dewater materials down to a moisture content of about 60%, although the invention is not so limited. Materials having a higher moisture content, including materials having a moisture content approaching 85%, can be burned in the reactor 126 without any dewatering, although reactor operation is improved if the moisture content does not exceed about 80%.

In some instances it may alternatively (or additionally) be desirable to reduce (or further reduce) the moisture content of the agricultural biofuel source 110 in a drying means 105. This is typically done when the dried product is intended for commercial sale and may need to be stored for extended periods, although it is possible (albeit typically not economically feasible) to provide some or all of the dried product to the reactor 126. In such embodiments, materials having a moisture content too high for the drying means 105 to handle are typically dewatered in the dewatering means 103 prior to drying. Specifically, most drying means 105 are not designed to handle material having an incoming moisture content of more than about 70%, although the invention is not so limited. Although it would be considered inefficient, it is technically possible to dry materials having a moisture content approaching 85% moisture with the drying means 105 alone. Therefore, if the drying means 105 can handle a higher moisture content material, the material need only be dewatered until it has the desired percentage for use in the drying means 105. In another embodiment, the high moisture material is not subjected to any dewatering prior to drying, although it is likely more cost effective to reduce the moisture content of a material as much as possible with the dewatering means 103 prior to drying in the drying means 105.

Use of drying means 105 may produce dryer vapors 107 that contain VOCs. If necessary, the dryer vapors 107 can be treated in a suitable environmental control 164 as shown in FIG. 1. Any type of environmental control 164 can optionally be added to the system at any suitable time during the process. In the embodiment shown in FIG. 1, the environmental control 164 also includes a component optionally added to the agricultural biofuel source 110 and/or directly to the reactor 126, to aid in reducing toxic emissions, e.g., limestone. Additionally or alternatively, as defined above, the environmental control 164 can be a piece of equipment, such as the reactor 126, when used to reduce toxic emissions from an added component, such as VOC-containing dryer vapors 107. The environmental control 164 located downstream in FIG. 1 is discussed further below.

The reactor 126 contains a fluidizing media 140, which is typically an inert fine-grained material of sufficient density, as is known in the art. Forced gas 134, such as air, is introduced into the bottom of the reactor 126, causing the fluidizing media 140 to fluidize and transfer heat to the incoming stream containing the agricultural biofuel source 110 and/or the stream containing dewatered agricultural biofuel from the dewatering means 103 and/or the stream containing dried agricultural biofuel from the drying means 105. The combustion process within the reactor 126 is initiated by a burner 143 during startup, as is known in the art. The burner 143 is fueled by any suitable type of auxiliary fuel, such as natural gas. After stabilization, the process may be self-sustaining without the need for any auxiliary fuel. If desired, however, auxiliary fuel can continue to be provided to the burner 143 during the process.

The resulting combustion gases 136, which contain heat, leave the reactor 126. A heat extractor 188 can optionally be used to extract a desired amount of heat 185 from the combustion gases 136 for a variety of applications, such as commercial sale, process load or electricity generation. Once the desired amount of heat 185 is extracted from the combustion gases 136, the resulting cooled combustion gases from the heat extractor 188, i.e., cooled heat extractor combustion gases 190, are sent to a suitable environmental control 164 for treatment prior to being released to the atmosphere. Alternatively, some or all of the cooled heat extractor combustion gases 190 can be provided to a waste heat boiler (hereinafter "boiler") 148 as shown to produce steam 158, assuming there is sufficient energy content in the cooled heat extractor combustion gases 190 to make this an economical option.

Upon exiting the reactor 126, the combustion gases 136 can additionally or alternatively enter the boiler 148. In the embodiment shown in FIG. 1, water 162 is pumped with a suitable pump 161 into a line containing any available condensate 170, to produce boiler feedwater 180. The primary source of condensate 170 is return from the agricultural biofuel source itself (such as an ethanol plant). The boiler feedwater 180 is then provided to the boiler 148. In the boiler 148, heat is extracted from the combustion gases 136 to produce cooled combustion gases, hereinafter cooled boiler combustion gases 163. This heat is transferred to the boiler feedwater 180 to form steam 158. The steam 158 can be used for a variety of applications, such as commercial sale, process load and/or electricity generation.

The cooled boiler combustion gases 163 exit the boiler 148 and are further processed in the same manner as any cooled heat extractor combustion gases 190 that may be present, namely with one or more suitable environmental controls 164, e.g., baghouse, scrubbers, wet or dry electrostatic precipitators, carbon filters, and the like to produce waste gas 167 containing cleaned cooled combustion gases and solids 166, such as ash. The waste gas 167 typically enters a freestanding stack and is discharged to the atmosphere.

Specific details of the equipment and processing steps are discussed below in reference to a specific embodiment in which the agricultural biofuel is comprised of ethanol byproducts.

Ethanol Byproducts as Agricultural Biofuels

Ethanol plants require large amounts of energy, such as steam and electricity, to operate. Much of the requisite energy is typically provided by various fossil fuels, such as natural gas, which continue to increase in cost. In addition to producing ethanol, ethanol plants also produce a profitable byproduct known as DDG or DDGS. However, as noted above, the value of DDG or DDGS is expected to decrease in the near future due to market oversupply. Thus, high fuel costs, together with reduced sales prices for DDG or DDGS are likely to have a negative impact on profitability for ethanol plants.

Additionally, U.S. government regulations limit the amount of volatile organic compound (VOC) emissions produced by ethanol plants. Compliance is typically achieved through use of a natural gas-fired thermal oxidizer. Oxidizers are designed to take dryer emissions containing VOCs and push them into a combustion chamber. Large quantities of natural gas are then added and combusted together with the dryer emissions at temperatures up to about 1500° F. for a period of up to about five (5) to 10 seconds. The resulting combustion gases are sent to a waste heat boiler where a portion of the heat is converted to steam. However, thermal oxidizer use may increase natural gas dependence, thus increasing operating costs.

This embodiment provides a cost-effective method for reducing fuel costs at ethanol plants while still providing various optional environmental controls. Such environmental controls include limiting VOC emissions by adding dryer vapors to the fluidized bed reactor and reducing sulfur dioxide emissions in the waste stream by combining the incoming ethanol byproduct stream with limestone, although the invention is not so limited.

In the description that follows, ranges, as well as particular values within those ranges, are given for the various parameters as exemplary values only and the invention is not limited in any way by the values given. However, it is to be assumed that these ranges and values are all interrelated in that the value or range given for one parameter is dependent on values or ranges previously noted upstream. In other words, the description that follows provides an exemplary operation, first in terms of broader operating ranges, followed in most instances by a more specific exemplary operating condition.

Figure 2:
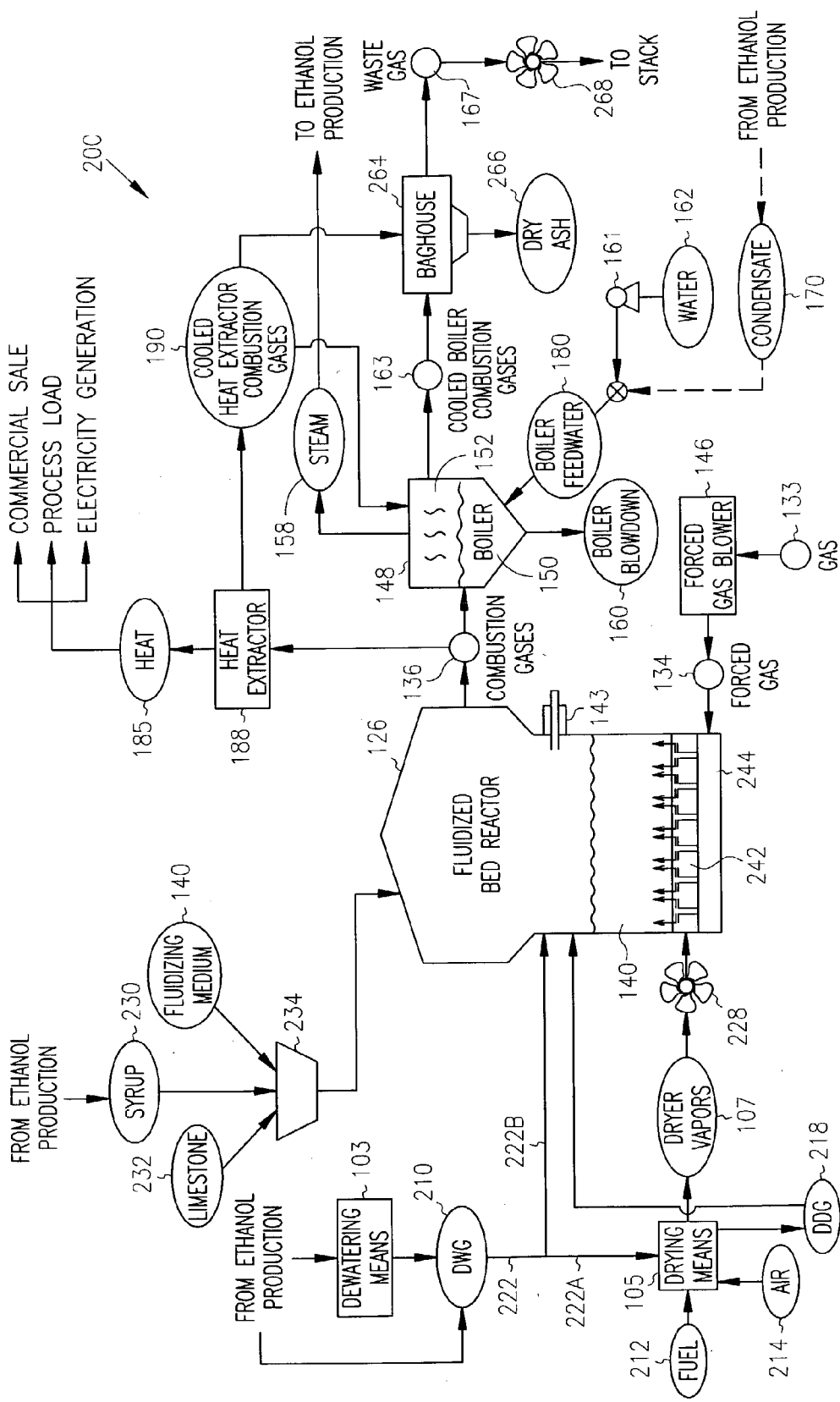
FIG. 2 is a simplified schematic drawing of a process for generating energy with a fluidized bed reactor using ethanol byproducts in one embodiment of the present invention.

In the embodiment shown in FIG. 2, the process 200 utilizes ethanol byproducts as the agricultural biofuel. In this embodiment, the energy generating system necessarily includes providing syrup 230, from an ethanol producing facility, as fuel to the reactor 126. In some embodiments DWG 210 from the same facility is also provided as fuel to the reactor 126, depending on economic considerations described herein. In some embodiments, some or all of the DDG 218 can also be provided to the reactor 126 as well, although this is not likely to be an economically viable option in most instances. In most embodiments, an auxiliary fuel, typically a fossil fuel, such as natural gas (not shown), is also used at start-up as fuel for the reactor 126, to power the burner 143 used to heat the fluidizing media 140 located in the reactor 126. In some embodiments, the auxiliary fuel may also be used during operation if economically desirable. Although dryer vapors 107 (produced when some or all of the DWG is dried) can also be input into the reactor 126, the dryer vapors 107 are not considered a fuel, but are input into the reactor 126 to destroy the VOCs and associated odors contained therein. In other words, the reactor 126 is being utilized as an environmental control with regard to the dryer vapors 107 and the dryer vapors 107 are not essential to the production of energy. In some embodiments, the dryer vapors 107 are not input into the reactor 126. In other embodiments, there are no dryer vapors 107.

In the embodiment shown in FIG. 2, the process 200 begins with providing DWG 210, dryer fuel 212 and air 214 to the drying means 105 to produce DDG 218 and dryer exhaust, i.e., dryer vapors 107. The source of the DWG 210 in this embodiment is the material leftover after ethanol is produced from a grain, typically corn, i.e., an ethanol byproduct. The DWG 210 typically contains about 30 to 45% solids and contains up to about 65% moisture, although the invention is not so limited. In one embodiment, the DWG 210 contains about 38% solids.

In one embodiment, a dewatering means 103 is used prior to providing the DWG 210 to the reactor 126 to reduce the moisture content to a desired level, such as about 65%, although the invention is not so limited. As noted above, material added to the reactor 126 can have a moisture content approaching 85%. In another embodiment, a drying means 105 is used to dry the DWG 210 to produce DDG 218, which is typically sold. In a particular embodiment, the dewatering means 103 is used prior to the drying means 105 to reduce the moisture content of the material down to a suitable level for drying in the drying means 105, such as about 65%, as discussed above.

The drying means 105 can be any suitable type of drying device known in the industry. In one embodiment, the drying means 105 is capable of reducing the moisture content in large quantities of material from about 65% down to about 10%. Reducing the moisture content of the agricultural biofuel, such as the DWG 210 below 10%, however, does not provide any added benefits to the resulting DDG 218, and only increases the fuel costs associated with the drying means 105. Excessive drying of the material also poses an increased fire hazard. However, it is important to reduce the moisture level of most materials to below about 12% in order to extend shelf life, because many materials, such as grain, will otherwise begin to decay and ferment quite rapidly under normal storage conditions at these higher moisture levels. In one embodiment, the moisture content of the DDG 218 is reduced to about 10.5%, as is known in the industry. For high moisture materials stored for one week or less, however, it is not necessary to reduce the moisture content by any means.

In one embodiment, the drying means 105 is a rotary drum dryer. Other dryer types that can be used include, for example, spray dryer or ring dryer, and the like. Any suitable type of dryer fuel 212 can also be used to power the drying means 105. In most embodiments, the dryer fuel 212 is a fossil fuel such as natural gas or propane, although a renewable power source can also be used in addition, or alternatively, to the fossil fuel. In a particular embodiment, a gas-powered "40136 Rotary Drum Dryer" made by ICM Inc., having offices in Colwich, Kans., is used. This particular make and model of ICM dryer is known to handle up to about seven (7) tons of dry product (DDG) per hour.

In the embodiment shown in FIG. 2, the incoming DWG stream 222 is split into two streams, i.e., a dryer DWG stream 222A that provides DWG 210 to the drying means 105 and a reactor DWG stream 222B that provides DWG 210 to the reactor 126. In one embodiment, the dryer DWG stream 222A contains about 60 to 70% by weight, of the total incoming DWG stream 222 and the reactor DWG stream 222B contains about 30 to 40%, although the invention is not so limited. Since DDG 218 can be profitably sold, depending on market conditions, as discussed above, either stream 222A or 222B can alternately contain 100% or 0% of the DWG 210.

Fossil fuel prices can also affect the decision as to the amount of DWG 210 sent through a fossil fuel powered drying means 105. In other words, the reason for diverting some of the DWG 210 into the drying means 105 via stream 222A is based primarily on economic, rather than functional, reasons. For example, if prices for dryer fuel 212 are reasonable and DDG 218 is selling at a reasonably high price, it may be more economical to run an increased amount or even all of the DWG 210 through the drying means 105, so that the resulting DDG 218 can be profitably sold in a commercial sale. In such embodiments, additional syrup 230 and/or natural gas fed through the overbed burner 143 can be added to the reactor 126 to meet reactor fuel requirements. On the other hand, if grain prices are depressed, it may be more economical to use more of the DWG 210 in the reactor 126. Increasing the flow of DWG 210 directly into the reactor 126 would, in turn, reduce or even eliminate the need for dryer fuel 212 to operate the drying means 105, which can also provide a cost-savings, particularly if fuel prices are high. In yet other embodiments, all or some of the DDG 218 produced can be provided to the reactor 126.

In the embodiment shown in FIG. 2, the DWG 210 in line 222A can enter the drying means 105 at any suitable temperature, such as between about 150 and 200° F. In one embodiment, the DWG 210 is at about 180° F. The DWG 210 can be flowed at any suitable rate, depending on the operation. In one embodiment, about 10,450 to 20,886 lbs/hr of DWG 210 flows into the drying means 105. Under these conditions, the energy input per unit time for the DWG 210 is between about $3.5 \times 10^7$ and $7 \times 10^7$ BTU/hr. In a particular embodiment, the flow rate of the DWG 210 is about 17,525 lbs/hr and the energy input per unit time is about $5.8 \times 10^7$ BTU/hr.

The dryer fuel 212 enters the drying means 105 at any suitable temperature and rate, depending on the operation. In most embodiments, the dryer fuel 212 is at ambient temperature. In one embodiment, the fuel 212 is natural gas flowing at a rate of between about 200 to 300 lbs/hr. Under these conditions, the energy input per unit time for the dryer fuel 212 is about $5 \times 10^6$ to $6 \times 10^6$ BTU/hr. In a particular embodiment, the flow rate of the fuel 212 into the drying means 105 is about 255 lbs/hr and the energy input per unit time is about $5.5 \times 10^6$ BTU/hr.

The combustion air 214 flows into the drying means 105 at any suitable rate, moisture level, and so forth. The various parameters for the air flow are typically set by the dryer manufacturer. In the above embodiment, in which the dryer fuel 212 is flowing into the drying means 105 at about 255 lbs/hr, the combustion air 214 is typically ambient air (or ambient air that has had moisture removed, such as with a dehumidifier) having no more than about one (1) % moisture content and flowing at a rate of between about 10,000 and 12,000 lbs/hr or about 2000 to 3000 standard cubic feet per minute (scfm). Although air having a higher moisture content can be used, such as up to 100% relative humidity, the higher the moisture content, the more inefficient the drying operation becomes. In one embodiment, the combustion air 214 is flowed at a rate of about 11,200 lbs/hr or about 2500 scfm. The DDG 218 exits the drying means 105 and is typically sold as described and/or can be provided to the reactor 126 as discussed above. Generally, about the same mass/hr of DDG 218 (solids) exits the drying means 105 as is input into the drying means 105 as DWG 210 (solids).

The dryer vapors 107 are drawn through a fan 228 into the reactor 126. Any suitable type of blowing or drawing means capable of handling large amounts of dryer vapors 107 can be used as the fan 228, including, but not limited to a centrifugal fan. In one embodiment, the fan 228 is a 75 to 80 brake HP (BHP) fan having an efficiency of between about 45 and 55% and an operating pressure of less than about 1.4 psi. In a particular embodiment, the fan 228 is a 75 BHP Greenheck Model P, Size 26 fan, made by Greenheck Fan Corporation having offices in Schofield, Wis., is used.

The dryer vapors 107 (which again are only present if DWG 210 has been dried) entering the reactor 126 are typically high in objectionable odors from the VOCs are present from the previous process, such as ethanol production. VOCs may also be present from other processes and activities in the plant, e.g., from loading ethanol into tankers, and shipped to the reactor 126 for destruction. Burning the VOCs in the reactor 126 causes the hydrocarbons, the source of the odors, to be converted into water and carbon dioxide. Essentially, the reactor 126 thermally oxidizes the emissions from the drying means 105, thus reducing the VOC content by about 98 to 100%. It is known that higher drying temperatures produce more VOCs, so the actual amount of VOCs present is dependent on many factors, including the type of grain processed. In one embodiment, corn is used as the ethanol-producing grain. In other embodiments, wheat, barley, sorghum and the like, each with varying amounts of VOCs can be used to produce ethanol. With certain types of DWG 210, use of the drying means 105 is not necessary because the storage time is sufficiently short, such as about one week or less, such that no drying is required, thus avoiding the production of VOCs altogether. VOC production can also be avoided if only dewatering is used to reduce moisture content, as discussed above.

The dryer vapors 107 typically include various levels of oxygen, nitrogen, carbon dioxide and water and are at an elevated temperature between about 150 and 250° F. In one embodiment, the dryer vapors 107 comprise about 10.5% oxygen, 55% nitrogen, 4% carbon dioxide and 30.5% moisture and are at a temperature of about 200° F. The dryer vapors 107 can be flowed at any suitable rate, depending on the operation, and depending on the particular type of fan 228 being used. In one embodiment, about 15,000 to 16,000 lbs/hr of dryer vapors 107 flow into the reactor 126. Under these conditions, the energy input per unit time of the dryer vapors 107 is between about $5 \times 10^6$ and $6 \times 10^6$ BTU/hr. In a particular embodiment, the flow rate of the dryer vapors 107 is about 15,500 lbs/hr, specifically comprising about 1600 lbs/hr of oxygen, 8500 lbs/hr of nitrogen, 650 lbs/hr of carbon dioxide and about 24,750 lbs/hr of moisture and the energy input per unit time is about $5.5 \times 10^6$ BTU/hr.

As FIG. 2 shows, syrup 230 is also added to the reactor 126. The syrup 230 is produced in an evaporator located in the ethanol plant (not shown). In that evaporator, moisture is removed from thin or dilute stillage, typically having about 12% solids, to produce syrup having between about 20 and 40% solids. As discussed further such solids may further include sulfur, although the invention is not so limited. The syrup 230 typically enters the reactor 126 at a temperature of between about 150 and 210° F. In one embodiment, the syrup 230 contains about 30% solids, having the consistency of thin oatmeal, and is at a temperature of about 180° F. The syrup 230 can be flowed at any suitable rate, depending on the operation. In one embodiment, about 40,000 to 55,000 lbs/hr of syrup 230 flows into the reactor 126. Under these conditions, the energy input per unit time for the syrup 230 is between about $1 \times 10^8$ and $1.5 \times 10^8$ BTU/hr. In a particular embodiment, the flow rate of the syrup 230 is about 42,500 lbs/hr and the energy input per unit time is about $1.1 \times 10^8$ BTU/hr. If available from offsite sources, additional syrup 230 can also be fed into the reactor 126.

In addition to the dryer vapors 107 and syrup 230 entering the reactor 126, any available DWG 210 in reactor DWG stream 222B can also be input into the reactor 126. The DWG 210 in reactor DWG stream 222B can be at any suitable temperature, and flowed at any suitable rate into the reactor 126, depending on the operation. In one embodiment, about 15,000 to 25,000 lbs/hr of DWG 210 in reactor DWG stream 222B flows into the reactor 126 at a temperature of between about 150 and 200° F. Under these conditions, the energy input per unit time for the DWG 210 is between about and $6.5 \times 10^7$ and $7.5 \times 10^7$ BTU/hr. In a particular embodiment, the flow rate of the DWG 210 in reactor DWG stream 222B is about 20,000 lbs/hr, the temperature of the DWG 210 is about 180° F. and the energy input per unit time is about $7 \times 10^7$ BTU/hr.

Under conditions when the dryer vapors 107 and syrup 230 entering the reactor 126 do not provide adequate energy input for the required steam 158 or heat 185 and market conditions preclude the use of DWG 210 for auxiliary fuel, natural gas can be input through the overbed burner 143 as an alternate auxiliary fuel. In other words, if the market value of the DWG 210 is greater than the market cost of natural gas on a BTU basis, it may be necessary to supplement the available fuel with natural gas. In one embodiment, the energy input per unit time for the natural gas fed through the overbed burner 143 as auxiliary fuel is between about and $6.5 \times 10^7$ and $7.5 \times 10^7$ BTU/hr.

In the embodiment shown in FIG. 2, limestone 232 (i.e., calcium carbonate) is also added to the reactor 126. However, the limestone 232 is added as an environmental control, not as a required component for producing energy. Specifically, the limestone 232 is used for the purpose of capturing sulfur dioxide generated during the combustion process. Sulfur dioxide is generated due to the sulfur present in the incoming reactor stream DWG 222B and syrup 230. The calcium in the limestone 232 chemically reacts with the sulfur dioxide to reduce emissions of sulfur dioxide by up to 80% or more. Instead the sulfur in the sulfur dioxide adheres to the limestone 232 to produce a salt, calcium sulfate, which drops into the fluidizing media 140 and/or is captured in an environmental control, such as the baghouse 264.

In this embodiment, the syrup 230 and limestone 232 are combined in a separate tank 234 prior to being added to the reactor 126, although the invention is not so limited. In one embodiment, the syrup 230 and limestone 232 are added separately. Limestone 232 can be flowed at any suitable rate necessary to provide adequate environmental control. In one embodiment, between about 100 and 150 lbs/hr of limestone is input into the reactor 126, together with the syrup 230. In the above embodiment, in which about 42,000 lbs/hr of syrup 230 is added, about 120 lbs/hr of limestone 232 is also added to the reactor 126.

The fluidizing media 140 is typically fine-grained sand of sufficient density, as is known in the art. The initial size of the particles comprising the fluidizing media 140 should not be so small as to allow an excess amount of fluidizing media 140 to exit the reactor 126 during operation, nor should the particles be so large as to prevent proper fluidization. It is expected, however, that the particle size of the fluidizing media 140 will be reduced during operation as the particles collide with other particles present in the reactor 126. As a result, a certain amount of particles and particle pieces will exit the reactor 126, pass through the other components of the system and out through the environmental control being used, as is known in the art. Therefore, although fluidizing media 140 is typically added in sufficient amounts to the reactor 126 prior to start-up via any suitable means, usually through an open port (not shown), additional fluidizing media 140 can also be added during the operation to keep the fluidizing media 140 content sufficiently high. In one embodiment, the fluidizing media 140 is maintained at a volume of between about 1900 and 2000 ft$^3$ in the reactor 126. In a particular embodiment, the volume is maintained at about 1950 ft$^3$.

In one embodiment, fluidizing media 140 added during operation is provided to the same tank 234 as the syrup 230 and limestone 232, as shown, although the invention is not so limited. In other embodiments, the fluidizing media 140 is not premixed with any other components prior to being added to the reactor 126. The fluidizing media 140 is added at any suitable rate needed to keep the level of the fluidizing media 140 sufficiently high during operation. In one embodiment, about 50 to 75 lbs/hr of make-up fluidizing media 140 is added to the reactor 126 to maintain the desired volume. In a particular embodiment, about 60 lbs/hr of fluidizing media 140 is added.

In most embodiments, the reactor 126 is a vessel that is contoured to be wider at the top than the bottom as shown in FIGS. 1 and 2. The overall size of the reactor 126 is not important as long as it is capable of performing the intended function and process the required amount of components in the desired time. In one embodiment, the lower (narrower) portion of the reactor 126 has a diameter of about 22 to 28 ft, while the upper (wider) portion of the reactor 126 has a diameter of about 29 to 35 ft with an overall height of about 35 to 45 ft. In a particular embodiment, the lower portion has a diameter of about 25 ft, the upper portion has a diameter of about 32 ft and the overall height of the reactor 126 is about 40 ft such that the reactor volume is about 21,500 ft$^3$. In one embodiment, the open space above the fluidizing media 140 prior to start-up, i.e., prior to the fluidizing media 140 being fluidized, is between about 16,000 and 16,500 ft$^3$. In a particular embodiment, the open volume is about 16,200 ft$^3$.

In one embodiment the reactor 126 is a carbon steel refractory lined vessel. The lining can be made from any suitable material or materials having adequate insulating properties and capable of withstanding high temperatures in excess of 1600° F., yet be able to keep the temperature of the outermost shell of the reactor 126 to around 120° F. or less. In one embodiment, the lining is a two-part lining comprising a masonry "backup" lining and firebrick. Each part of the lining can be any suitable thickness, but in most embodiments, the backup lining is thicker than the firebrick. In a particular embodiment, the backup lining is between about eight (8) and 10 in thick, while the firebrick is between about four (4) and five (5) in thick. The outermost portion of the lining, i.e., the backup lining, is adjacent to the "skin" of the reactor 126. In most embodiments, the "skin" of the reactor 126 is also comprised of multiple components, such as an inner steel layer, an outer aluminum jacket, with a fiberglass insulation in between. In one embodiment, the total thickness of the skin is about one 1.5 in, although the invention is not so limited. Use of a multi-component skin, however, prevents workers from coming in contact with the high temperatures of the inner steel layer, which can be up to about 200° F. This configuration also helps to maintain the temperature of the inner aluminum jacket sufficiently high to be above the condensation temperatures of various corrosive gases (e.g., HCl, $H_2SO_4$, and so forth). In a specific embodiment, the reactor 126 is a custom-designed reactor made by Von Roll Inc., having offices in Norcross, Ga. If desired, the entire reactor 126 can be kept sufficiently cool by any suitable means. In one embodiment, the entire reactor 126 rests on concrete grooves. In another embodiment, the reactor 126 is water-cooled.

Forced gas 134, such as air, is introduced into the bottom of the reactor 126, through a plenum 244. The forced gas 134 flows through openings in a grating 242 that rests over the plenum 244, causing the fluidizing media 140 to fluidize and transfer heat to the incoming waste streams (typically dryer vapors 107, DWG 210 and syrup 230), thus producing combustion gases 136. The temperature of the fluidizing media 140 and the time the waste streams are exposed to it will vary, depending on the particular operation. In one embodiment, the temperature of the fluidizing media 140 is between about 1300 and 1650° F. during operation and the waste streams are exposed to the elevated temperature for about eight (8) to 10 seconds.

As noted above, the combustion process within the reactor 126 is initiated by the burner 143 during startup, as is known in the art. Any suitable type of burner 143 can be used. In one embodiment, an "over-bed burner" is used. An "over-bed burner" refers to a burner physically located in the reactor 126 just above the fluidized bed media. In one embodiment, the burner 143 is a Peabody Engineering Model G/O-12.5 MM made by Peabody Engineering Corporation, having offices in Shelton, Conn.

The burner 143 serves to heat the fluidizing media 140 to a sufficiently high temperature, such as about 1500° F. or above, although the invention is not so limited. As noted above, this burner 143 is fueled by any suitable means, typically a fossil fuel. In one embodiment, the burner 143 is powered by natural gas. Essentially, the flow of fluidizing gas through the openings in the grating 242 sets the particles in the fluidizing media 140 in suspended motion. The reactor 126 is designed to use the properties of the fluidized media 140 (preheated to a high temperature as described above) to transfer heat to the waste streams being input into the reactor 126. The fluidizing media 140 is typically inert and physically similar to a liquid, such that heat transfer to the other components (which initiates their combustion), is usually rapid. As a result, fluidized bed reactors are generally considered to be superior to hot air furnaces when seeking to combust a fuel because of the complete combustion that is accomplished and the ability of the fluidized bed to combust high moisture-containing materials.

A fluidized bed reactor 126, such as is used herein, is also preferable to a fluidized bed gasifier, such as the one described in U.S. Pat. No. 4,848,249 to LePori et al, because a fluidized bed gasifier operates in a closely monitored environment that, in most instances, vaporizes a base material that must not contain more than about 20% moisture, by weight. Additionally, the fuel for a gasifier must be blended consistently so that it is homogenous, since such systems cannot handle much fluctuation. For example, with a gasifier, it is necessary to closely control the amount of oxygen supplied in the fuel. If there is too much oxygen, the gas combusts in the gasifier, thus reducing gas production. If too little oxygen is provided, the gas does not gasify. The resulting product is a combustible gas typically used as natural gas that powers a turbine or boiler burner. However, this gas must be cleaned in order to be suitable for such use, adding an additional step to the process.

In one embodiment, the grating 242 is a free-standing, movable steel grate that rests on a lip (not shown) located around the circumference of the reactor 126. In the embodiment shown in FIG. 2, the grating 242 is further comprised of a series of small T-shaped hollow tubes designed to allow forced gas 134 from the plenum 244 below to pass up into the fluidizing media 140, while preventing the particles of the fluidizing media 140 from falling down into the plenum 244. In one embodiment about 700 to 2500 tubes, each having a diameter of between about 0.25 and 1.5 in are used in the grating 242. In a particular embodiment, about 1340 tubes having a diameter of about 0.5 in each are used.

The forced gas 134 is provided by a forced gas blower (hereinafter "blower") 146. Any suitable forced gas blower 146 can be used. In one embodiment, the forced gas blower 146 is a Gardner Denver Blower Division Model 2400000200AD01 forced air blower made by Gardner Denver, Inc., having offices in Quincy, Illinois. In one embodiment, the gas 133 is air, which enters the blower 146 at a temperature of between about 70 and 80° F., and the forced gas 134 exiting the blower 146 is forced air at a temperature of between about 120 and 140° F. In one embodiment, the gas 133 is air, which enters the blower 146 at a temperature of about 75° F., and the forced gas 134 exiting the blower 146 is forced air at a temperature of about 133° F. In one embodiment, the gas 133 entering the blower 146 is ambient air at atmospheric pressure, while the forced gas 134 exiting the blower 146 is forced air at a slightly elevated pressure, such as between about 16 and 18 psia. In one embodiment, the forced gas 134 exits the blower 146 at a pressure of about 17.3 psia. The volume of forced gas 134 provided to the reactor 126 varies, but in one embodiment is between about 35,000 and 40,000 scfm. The blower 146 can operate at any suitable efficiency and horsepower, such as between about 60 to 70% and 750 to 800 BHP, respectively. In one embodiment, the blower 146 operates at about 65% efficiency and about 785 BHP. In a particular embodiment, the forced gas 134 is flowing at a rate of about 63 ft/sec as it enters the grating 242 and is forced up through the individual T-shaped openings of the grates at a rate of about 150 to 500 ft/sec. In a particular embodiment, the flow rate of the forced gas 134 through the individual grates is about 330 ft/sec.

The resulting combustion gases 136 exiting the reactor 126 contain, in most embodiments, oxygen, nitrogen, carbon dioxide, sulfur dioxide, sulfur trioxide, nitrous oxide and water, as well ash, HCl and a few particles from the fluidized bed 140. The combustion gases 136 are typically at a temperature in excess of about 1600° F. In one embodiment, about 50 to 75 lbs/hr of fluidizing media 140, such as sand particles, are typically swept up into the combustion gases 136 during operation. The combustion gases 136 exit the reactor 126 at any suitable rate, depending on many factors, as is known in the art, including the temperature of the fluidizing media 140, the temperature and velocity of the forced gas 134, the type of agricultural biofuel source being utilized, and so forth. In one embodiment, between about 200,000 and 300,000 lbs/hr of combustion gases 136 flow out of the reactor 126. Under these conditions, the energy output per unit time for the combustion gases 136 is between about $1.8 \times 10^8$ and $2 \times 10^8$ BTU/hr. In a particular embodiment, the composition of the combustion gases 136 is about 3% oxygen, 55% nitrogen, 15.6% carbon dioxide, 24.6% water, 1% ash, with the remaining components comprising less than 1% total and consisting of, for example, sulfur trioxide HCl and nitrous oxide. In a particular embodiment, the overall flow rate of the combustion gases 136 is about 250,000 lbs/hr, specifically comprising about 8100 lbs/hr of oxygen, 138,000 lbs/hr of nitrogen, 39,000 lbs/hr of carbon dioxide, 78 lbs/hr of sulfur dioxide, five (5) lbs/hr of sulfur trioxide, 17 lbs/hr of nitrous oxide, and 61,600 lbs/hr of water and about 2600 lbs/hr of ash and the energy output per unit time is about $1.9 \times 10^8$ BTU/hr.

In addition to the energy input or output per unit time from the various components entering and exiting the reactor 126, heat input and output are also considerations in the overall energy balance for the reactor 126. This includes the sensible heat input from the dryer vapors 107, sensible heat input from the forced gas 134 and the radiation output from the combustion gases 136. (Sensible heat is generally considered to be the enthalpy difference between some reference temperature and the temperature of the material under consideration, excluding any enthalpy differences for phase changes). In one embodiment, the sensible heat input is between about $6.5 \times 10^6$ and $7 \times 10^6$ BTU/hr and the radiation output, i.e., heat loss, is between about $2 \times 10^6$ and $3 \times 10^6$ BTU/hr. In a particular embodiment, the sensible heat input is about $6.7 \times 10^6$ BTU/hr and the radiation output is about $2.6 \times 10^6$ BTU/hr. In one embodiment, the sum of all the energy inputs minus the heat losses from other sources (e.g., radiation, etc.) combine to provide the thermal energy to the boiler 148 and/or the heat extractor 188. In other embodiments, this is the energy contained in the heat 185 used in other applications, such as for a process load, and so forth, as shown in FIG. 2. Generally, the flow rates of the fuel sources, typically the syrup 230, DWG 210, as well as the natural gas used at start-up for the burner 143, are metered to provide a sufficient amount of heat to produce a given pressure for the steam 158 in the boiler 148. The pressure of the steam 158 is also important to the associated processing plant, whether it is producing ethanol, electrical energy, or the like. In a particular embodiment, namely, for the production of ethanol, steam 158 is produced at a rate of about 94,000 lbs/hr and is at a pressure of about 75 psi.

For additional details on the operation of a fluidized bed reactor, see, for example, U.S. Pat. No. 3,653,843 to Seelander, entitled "Fluidized Bed Apparatus," issued Apr. 4, 1972 and U.S. Pat. No. 3,309,262 to Copeland, entitled, "Fluidized Bed Oxidation of Waste Liquors Resulting from the Digestion of Cellulosic Materials for Paper Making," issued Mar. 14, 1967, both of which are hereby incorporated herein by reference.

In one embodiment, heat 185 from the combustion gases 136 is drawn off for commercial sale, used as a process load and/or electricity generation, as noted above and shown in FIG. 2. That is, rather than using all of the heat 185 to heat water in the boiler 148, a desired amount is instead used as a commodity. The heat 185 can be drawn off or extracted with the heat extractor 188, such as an air to air or air to process heat exchanger as is known in the art. Using the example contained herein, if all the heat 185 that is considered to be "useful" is drawn off at this point, this would provide between about $1.8 \times 10^8$ and $2 \times 10^8$ BTU/hr of heat for commercial sale, process load and/or electricity generation. The resulting cooled heat extractor combustion gases 190 can be sent for treatment in a suitable environmental control, such as the baghouse 264 shown in FIG. 2. It is important, however, that the temperature of the cooled heat extractor combustion gases 190 entering the environmental control is not below the dew point of the cooled heat extractor combustion gases 190, causing them to condense. This is particularly true if the environmental control being used is a baghouse 264, since it is quite difficult to remove ash 266 if the incoming material is too wet.

In one embodiment, only some of the heat 185 is drawn off and the remaining cooled heat extractor combustion gases 190 are provided to the boiler 148 to produce steam 158 and cooled boiler combustion gases 163 as shown in FIG. 2. In other words, it may be desirable to send some or all of the cooled heat extractor combustion gases 190 to the boiler 148 if there is sufficient heat content remaining in the cooled heat extractor combustion gases 190 such that it makes economic sense to use the boiler 148 to produce steam 158 with these gases 190. However, if the cooled heat extractor combustion gases 190 are fed to the boiler 148, the amount of heat withdrawn for use in the boiler 148 should not be so much as to reduce the temperature of the resulting cooled boiler combustion gases 163 entering the environmental control below the dew point of the cooled boiler combustion gases 163, causing them to condense, as noted above.

In another embodiment, the combustion gases 136 can additionally or alternatively enter the boiler 148. Specifically, it is possible to extract a portion of the heat 185 as described above, and still provide combustion gases 136 directly to the boiler 148 to produce steam 158 and cooled boiler combustion gases 163. The amount of energy used for heat and/or steam can be split in any desired proportion, depending on many factors, such as the steam and heat loads required, the amount and type of agricultural biofuel available, the capital costs involved in moving the product to its final destination, and so forth. It is expected, however, that the amount of steam 158 produced will be reduced in roughly the same proportion to the amount of heat 185 extracted in the heat extractor 188. As an example, if about 50% of the heat content is extracted in the heat extractor 188, the amount of steam produced in the boiler 148 is expected to be reduced by about 50%.

Any suitable type of boiler 148 known in the art can be used. In one embodiment the boiler 148 is a custom-designed waste heat boiler made by Alstom Power Energy Recovery Inc., owned by Alstom Holdings, having offices in Paris, France. This particular type of Alstom boiler is comprised of a mud drum 150 and a steam drum 152 as shown in FIG. 2, with connecting water tubes (not shown). Such a boiler is similar to a standard water tube boiler except that is does not have a burner section, as is known in the art.

In the embodiment shown in FIG. 2, the boiler 148 is provided with boiler feedwater 180 as shown. The boiler feedwater 180 is comprised of water 162 and any condensate 170. In the embodiment shown in FIG. 2, the water 162 is pumped with a pump 161 into the same line as the condensate 170 to form the boiler feedwater 180, although the invention is not so limited. In other embodiments, the condensate 170 and water 162 are combined prior to being pumped into the boiler 148. Basically, any number and configuration of pumps, valves and lines can be used to provide the boiler feedwater 180 to the boiler 148. In one embodiment, the pump 161 is a multi-stage centrifugal pump operating at between about 40 to 50 psi per stage that pumps the water 162 into a line into which the condensate 170 is also added. In a specific embodiment, a Flowserve Model 1.5WDXD/8, manufactured by Flowserve Corporation, having offices in Chesapeake, Va., is used. In one embodiment, the water 162 being pumped is at about room temperature, such as about 70° F., flowing at a rate of between about 15,000 and 25,0000 lbs/hr and has an energy content per unit time of between about $1.4 \times 10^7$ and $1.8 \times 10^7$ BTU/hr. In a particular embodiment, the boiler feedwater 180 is provided at a temperature of about 189° F., at a flow rate of about 105,000 lbs/hr and has an energy content per unit time of about $1.65 \times 10^7$ BTU/hr.

Any available condensate 170 from the ethanol production facility itself can be returned to the boiler 148 as shown in FIG. 2. In a particular embodiment, approximately 80% of the steam 158 produced by the boiler 148 is returned from the ethanol plant in the form of condensate 170. The condensate 170 is typically at temperatures just under 212° F. and at atmospheric pressure. In other embodiments, the condensate 170 is pressurized, and can therefore be at higher temperatures. The amount of water 162 added is dependent on the amount of condensate 170 returned to the system. In the above example, sufficient water 162 is added to replace the 20% of the steam consumed in powering the ethanol facility.

In an alternative embodiment (not shown) the steam drum 152 is provided with heated water from an economizer. An economizer helps to increase the efficiency of the reactor 126 by preheating the boiler feedwater 180 used to cool the combustion gases 136 entering the boiler 148. The decision to use an economizer is both a technical and an economical decision that will vary with the particular operation. Any suitable type of economizer known in the art can be used. The benefits of an economizer are generally realized when the dew point of the steam 158 is well above the condensation temperature of the cooled boiler combustion gases 163, as is known in the art. Generally, an economizer is sized to keep the boiler feedwater 180 at a temperature well below the boiling temperature of water at the specified steam pressure of the boiler 148 being used.

To continue, as the boiler 148 heats the boiler feedwater 180, impurities drop to the bottom, i.e., the "mud" drum 150. The boiler 148 is designed to heat water by any suitable means. In one embodiment, the boiler 148 is essentially a heat exchanger containing water-filled tubes that are heated with hot combustion gases 136 from the reactor 126. In one embodiment the combustion gases 136 from the reactor 126 enter the boiler 148 at a temperature of between about 1400 and 1500° F., thus heating the water contained in the water-filled tubes from a temperature of less than about 200° F. to a temperature of about 300° F. The steam 158 typically exits the boiler 148 at a temperature of between 250 and 350° F. and a pressure of between about 25 and 400 psia. Under these conditions, the energy output per unit time of the steam 158 is between about $1 \times 10^8$ and $1.4 \times 10^8$ BTU/hr. The pressure used is dependent on many factors, but may be determined, in part, by steam turbine requirements downstream. Although a higher pressure allows the steam 158 to be moved more easily to other locations, it is typically more efficient to keep the pressure below about 150 psia. In a particular embodiment, the steam 158 is at a temperature of about 308° F., a pressure of about 75 psia and the energy output per unit time is about $1.2 \times 10^8$ BTU/hr.

Boiler blowdown 160 also exits the boiler 148 as shown. The boiler blowdown 160 typically contains impurities from the water 162. These impurities can accumulate from the piping used for the condensate 170 as well as from impurities already present in the water 162. Although various chemical treatments can be used to remove some impurities prior to the water 162 being used in the boiler 148, typically, such methods are used on only a limited basis, since it is known that many such impurities can be removed more economically in the boiler blowdown 160 itself. In other words, removing the boiler blowdown 160 cleans the water tubes in the boiler 148 and adds to the general "health" of the boiler 148 and associated steam system. In one embodiment, the boiler blowdown 160 is also initially at a temperature of between about 250 and 350° F. and flows at a rate of between about 4800 and 5200 lbs/hr and has an energy output per unit time of between about $1.2 \times 10^6$ and $1.5 \times 10^6$ BTU/hr. In a particular embodiment, the boiler blowdown 160 is at a temperature of about 308° F., with a flow rate of about 4990 lbs/hr and energy output per unit time of about $1.38 \times 10^6$ BTU/hr. Technically, the boiler blowdown 160 consists of two components, namely a liquid "blowdown" component and "flash steam" component. In the embodiment noted herein in which the boiler blowdown 160 is initially at 308° F., flowing at a rate of about 4990 lbs/hr and having an energy output per unit time of about $1.38 \times 10^6$ BTU/hr, the liquid portion of the boiler blowdown 160 is at a temperature of about 250° F., flowing at a rate of about 4700 lbs/hr, with an energy content per unit time of about $1 \times 10^6$ BTU/hr, while the flash steam component is also at a temperature of about 250° F., flowing at a rate of about 303 lbs/hr, with an energy content of about 353,000 BTU/hr. Other details concerning the operation of the boiler 148 will not be discussed herein, including the use of a deaerator, use of chemical treatment for incoming water and/or water treatment of exiting water, and the like, as those skilled in the art will understand and appreciate the general principles involved.

The amount of steam 158 produced by the process described herein can vary considerably. Based on the ranges provided herein, between about 75,000 and 125,000 lbs/hr of steam can be produced (when no heat 185 is drawn off as described above). In a specific embodiment, as described herein, for approximately every 42,000 lbs/hr of syrup, 12,222 lbs/hr of limestone, 19,980 lbs/hr of DWG (either with or without 15,500 lbs/hr of dryer vapors 107) input into the reactor 126, together with a forced gas flow of about 36,300 "actual" ft³/min (acfm) into the plenum 144 with about 1900 ft³/min of fine grained sand particles as the fluidizing media 140 that have been heated to a temperature of about 1500° F. initially, it is expected that about 100,000 lbs/hr of steam 158 can be produced.

To continue, cooled boiler combustion gases 163, essentially identical in composition to the combustion gases 136, but at a lower temperature, exit the boiler 148 and enter any suitable type of environmental control 164 as described in reference to FIG. 1. (Alternatively or additionally, cooled heat extractor combustion gases 190, also identical in composition to the cooled boiler combustion gases 163, can enter either the boiler 148 or the environmental control 164 as described above, with the process continuing in the same manner as described below). In the embodiment shown in FIG. 2, the cooled boiler combustion gases 163 (and/or cooled heat extractor combustion gases 190) enter the baghouse 264 where they are cleaned of particulates to produce a waste stream 167 containing cleaned cooled combustion gases (from the boiler 148 and/or heat extractor 188) and dry ash 266. The waste gas 167 typically enters a stack where it is discharged to the atmosphere. The dry ash 266 contains particulates typically comprising the inert ash initially found in corn and carbon particles from the combustion of the DWG 210, and so forth, as well as sand particles, and is usually sent either to a landfill or can be used as an aggregate for cement, as a fertilizer, etc.

Any suitable type of baghouse 264 can be used as is known in the art. Typically the baghouse 264 uses a conventional dense phase ash removal system with the ash exiting the baghouse 264 through one or more hoppers. In the embodiment described herein, in which about 100,000 lbs/hr of steam is produced, between about 2000 and 3000 lbs/hr of ash is produced. In one embodiment, about 2600 lbs/hr of ash is produced. Oftentimes, the collected ash is stored in an ash silo (not shown) that is sized to store several days of collected ash. In one embodiment, the ash silo is sized to store about three days of collected ash, or approximately 100 tons. In one embodiment, the baghouse 264 is Amerex Model RP-16-272-D6, manufactured by Amerex Industries, Inc., having offices in Kennesaw, Ga.

A drawing means, such as an induced draft fan 268 pulls the waste gas 167 through the baghouse 264 and out through the stack. Any suitable type of induced draft fan 268 can be used. In one particular embodiment, the induced draft fan operates at between about 60 to 70% efficiency and at less than about one atm, handling a volume of between about 95,000 and 105,000 acfm of material. In a particular embodiment, the induced draft fan is a RB1210-4 model blower made by Robinson Industries, Inc., having offices in Zelienople, Pa., that is operating at about 65% efficiency and a pressure of about 13.8 psi, handling about 101,500 acfm of material, with a brake horsepower (BHP) of around 300.

The waste gas 167 exits at a temperature in excess of about 300° F. and above atmospheric pressure. The waste gas 167 typically contains nitrous oxides, oxygen, nitrogen, carbon dioxide, small levels of sulfur dioxide and sulfur trioxide and moisture, as well as sand particles. In one embodiment, the waste gas 167 exits at a temperature of about 400° F. and a pressure of just under about 14.3 psia, at a rate of about 241,000 lbs/hr, with an energy output per unit time of about $8.1 \times 10^7$ BTU/hr. In one embodiment, the components include about 3% oxygen, 58% nitrogen, 16% carbon dioxide, 23% water, and less than 1% of other components, including very minor amounts of sulfur dioxide, sulfur trioxide and nitrous oxides. In a specific embodiment, the waste gas 167 contains about 8100 lbs/hr of oxygen, 138,000 lbs/hr of nitrogen, 39,000 lbs/hr of carbon dioxide and about 55,200 lbs/hr of moisture.

The determination of the size needed for an energy generating facility in a particular application, which can, in some embodiments, include the agricultural biofuel production facility, as well as an electricity-generating facility, reflects a number of issues and assumptions. This includes projected quantities of agricultural biofuel as it relates to BTU value. With regard to grain sources, such as from an ethanol plant, projected split between DWG and DDG production must also be determined, as well as the amount of dryer vapors to be processed. Sizing typically insures that sufficient energy for commercial sale, process load or electricity generation is satisfied. Alternatively, sizing can be based on the premise that all the available economic biofuel inputs will be consumed. Economic factors surrounding the available biofuel inputs and energy (heat or steam) use are then balanced to determine the overall sizing requirements.

The specific materials and designs of additional minor components necessary to perform the process, e.g., valves, pumps, lines, and the like, are understood in the art will not be described herein. The apparatus and method of the invention can further be implemented using a variety of specific equipment available to and understood by those skilled in process control art. For example, means for sensing temperature, pressure and flow rates in all of the flow lines may be accomplished by any suitable means. It will also be appreciated by those skilled in the art that the invention can include a system controller.

Specifically, the system controller can be coupled to various sensing devices to monitor certain variables or physical phenomena, process the variables, and output control signals to control devices to take necessary actions when the variable levels exceed or drop below selected or predetermined values. Such amounts are dependent on other variables, and may be varied as desired by using the input device of the controller. Such sensing devices may include, but are not limited to, devices for sensing temperatures, pressures and flow rates, and transducing the same into proportional electrical signals for transmission to readout or control devices may be provided for in all of the principal fluid flow lines. Such a controller may be a local or remote receiver only, or a computer, such as a laptop or personal computer as is well-known in the art. In one embodiment, the controller is a personal computer having all necessary components for processing input signals and generating appropriate output signals as is understood in the art. These components can include a processor, a utility, a driver, an event queue, an application, and so forth, although the invention is not so limited. In one embodiment, the controller has a non-volatile memory comprised of a disk drive or read only memory device that stores a program to implement the above control and store appropriate values for comparison with the process variables as is well known in the art.

In one embodiment, these components are all computer programs executed by a processor of the computer, which operates under the control of computer instructions, typically stored in a computer-readable media such as a memory. In this way, useful operations on data and other input signals can be provided by the computer's processor. The controller also desirably includes an operating system for running the computer programs, as can be appreciated by those within the art. The system controller may also comprise a machine coupled to a control panel. Buttons and dials can be provided on the control panel to allow modification of the values and to control of the agricultural biofuel energy generating system to take the desired steps described herein. The system controller can also be programmed to ignore data from the various sensors when the operator activates certain other buttons and dials on the control panel as he deems necessary, such as fill override or emergency stop buttons. Alternatively, or in addition to the foregoing, the control panel can include indicator lights or digital displays to signal an operator as to the status of the operation. Indicator lights can also be used to signal that a certain variable level is outside the desired range, therefore alerting the operator to the need for corrective action. In such an embodiment, the corrective action is not automatic, but requires the operator to initiate corrective action either by pushing a specific button or turning a specific dial on the control panel, or by manually adjusting the appropriate valve or device.

Additionally, as is known in the art, in implementing the system described herein, general chemical engineering principles must be adhered to, including accounting for the various types of energy and materials being input to and output from the system, in order to properly size the system. This includes not only the energy associated with mass flow, but also energy transferred by heat and work. In some embodiments, the system is optimized for maximum performance utilizing any known optimization methods known in the art.

The agricultural biofuel energy generating system described herein provides a novel means for producing energy in the presence of excess oxygen, without the requirement of a homogenous fuel, as with gasifiers. The process is therefore relatively simple to control, such that it is only the volume of the incoming fuel that needs to be controlled.

The agricultural biofuel energy generating system can be used to produce energy, i.e., heat or steam, for a number of uses, including for commercial sale, process load and electricity generation. In the exemplary embodiment described in detail herein, the system is designed to generate energy in quantities necessary to sustain the operation of an ethanol plant. In such embodiments, the system uses DWG and syrup as the main source of fuel, with the option of using an auxiliary fuel, such as natural gas in addition, during start-up and/or throughout the entire process. However, by limiting the use of fossil fuels, such as natural gas, operational costs are reduced. Additionally, by treating dryer vapors in the reactor, VOC emissions are reduced or eliminated. Additionally, these advantages are accomplished without the need to retrofit other types equipment to the system, such as a thermal oxidizer and waste heat boiler.

The process described herein is efficient, economical and relatively simple in operation. The process makes use of production waste products that must otherwise be properly disposed of, sometimes at significant costs. The process further allows a costly operating liability to be turned into a valuable business asset, while simultaneously providing numerous advantages for the environment.

With regard to the embodiment that utilizes ethanol byproducts, the process also does not require additional steps in between the steps of producing ethanol and combusting the waste streams from ethanol to produce heat or steam, such as first feeding wet grain residue to feed livestock to produce methane for combustion, as described in U.S. Pat. No. 6,355,456 to Hallberg et al, entitled, "Process of using Wet Grain Residue from Ethanol Production to Feed Livestock for Methane Production," issued Mar. 12, 2002. In other words, with the exception of dewatering and/or drying the agricultural biofuel in some instances, production waste streams can be utilized as agricultural biofuels "as is" in the energy generating system described herein.

In one embodiment, the source of the agricultural biofuel and energy generating system itself are located on the same site or less than about 1 km of each other, although the invention is not so limited. The advantage, however, of having the energy generation system in close proximity to the agricultural biofuel-producing source, such as an ethanol plant, is that in embodiments in which the energy generated with the system described herein is consumed to provide power to the facility, there is no need for an elaborate and expensive piping system. In other embodiments, the energy produced with the energy generating system is piped any desired distance to be utilized in any desired manner. In yet other embodiments, some or all of the energy is used to power other types of manufacturing facilities and/or is sold to a local utility, and/or is used to generate electricity on-site.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the invention. It is intended that this invention be limited only by the following claims, and the full scope of equivalents thereof.

What is claimed is:

1. A process for producing steam comprising:
in a fluidized bed reactor, converting an ethanol byproduct to steam with a combustion process, wherein the ethanol byproduct is a grain stillage corn-based syrup containing about 20 to 40% solids, the solids including sulfur, further comprising combining the sulfur with limestone to reduce sulfur dioxide emissions by over 80%.

2. The process of claim 1 further comprising:
producing combustion gases in the fluidized bed reactor;
extracting heat from the combustion gases in a boiler; and
transferring the heat to boiler feedwater to form steam and cooled combustion gases.

3. The process of claim 1 further comprising:
cleaning the cooled combustion gases of particulates in a baghouse filter to produce ash and cleaned cooled combustion gases; and
discharging the cleaned cooled combustion gases to the atmosphere.

4. A process for producing steam comprising:
in a fluidized bed reactor, converting an ethanol byproduct to steam with a combustion process, wherein the ethanol byproduct is DWG and grain stillage corn-based syrup containing about 20 to 40% solids, further comprising drying a portion of the DWG to produce DDG and dryer vapors, wherein the dryer vapors are input into the fluidized bed reactor to reduce volatile organic compounds by more than 98%.

5. The process of claim 4 wherein the volatile organic compounds are reduced by nearly 100%.

6. A process for producing steam comprising:
in a fluidized bed reactor, converting an ethanol byproduct to steam with a combustion process, wherein the ethanol byproduct is a grain stillage corn-based syrup containing about 20 to 40% solids, the solids including sulfur, further comprising combining the sulfur with limestone to reduce sulfur dioxide emissions, wherein the limestone and grain stillage syrup are combined prior to being added to the fluidized bed reactor.

7. A process comprising:
providing grain stillage syrup to a fluidized bed reactor to produce combustion gases;
cooling the combustion gases in a boiler to produce steam and cooled combustion gases;
cleaning the cooled combustion gases of particulate to produce cleaned cooled combustion gases and ash;
discharging the cleaned cooled combustion gases to the atmosphere; and
providing dryer vapors to the fluidized bed reactor, wherein volatile organic compounds are reduced.

8. A process for producing steam comprising:
in a fluidized bed reactor containing a fluidizing media comprised of sand particles, converting an ethanol byproduct containing at least 20% moisture to steam with a combustion process, wherein the temperature of the fluidizing media is raised to about 1500° F. at start-up through use of a burner;
producing combustion gases in the fluidized bed reactor;
extracting heat from the combustion gases in a boiler, wherein the combustion gases enter the boiler at a temperature of between about 1400 and 1500° F.; and
transferring the heat to boiler feedwater to form steam and cooled combustion gases.

9. A process comprising:
providing grain stillage syrup to a fluidized bed reactor to produce combustion gases, wherein the grain stillage syrup contains sulfur;
cooling the combustion gases ma boiler to produce steam and cooled combustion gases;
cleaning the cooled combustion gases of particulate to produce cleaned cooled combustion gases and ash;
discharging the cleaned cooled combustion gases to the atmosphere; and
adding limestone to the fluidized bed reactor to reduce sulfur dioxide content in the combustion gases by over 80%, wherein the volatile organic compounds are reduced by nearly 100%.

* * * * *

UNITED STATES PATENT AND TRADEMARK OFFICE
CERTIFICATE OF CORRECTION

PATENT NO. : 7,263,934 B2
APPLICATION NO. : 10/373668
DATED : September 4, 2007
INVENTOR(S) : Copeland et al.

It is certified that error appears in the above-identified patent and that said Letters Patent is hereby corrected as shown below:

In column 4, line 29, delete "perchlorethylene" and insert -- perchloroethylene --, therefor.

In column 6, line 11, delete "beat" and insert -- heat --, therefor.

In column 18, line 51, delete "acfin" and insert -- acfm --, therefor.

In column 22, line 43 (Approx.), in claim 9, delete "ma" and insert -- in a --, therefor.

Signed and Sealed this

Fourth Day of December, 2007

JON W. DUDAS
*Director of the United States Patent and Trademark Office*